UNITED STATES PATENT OFFICE.

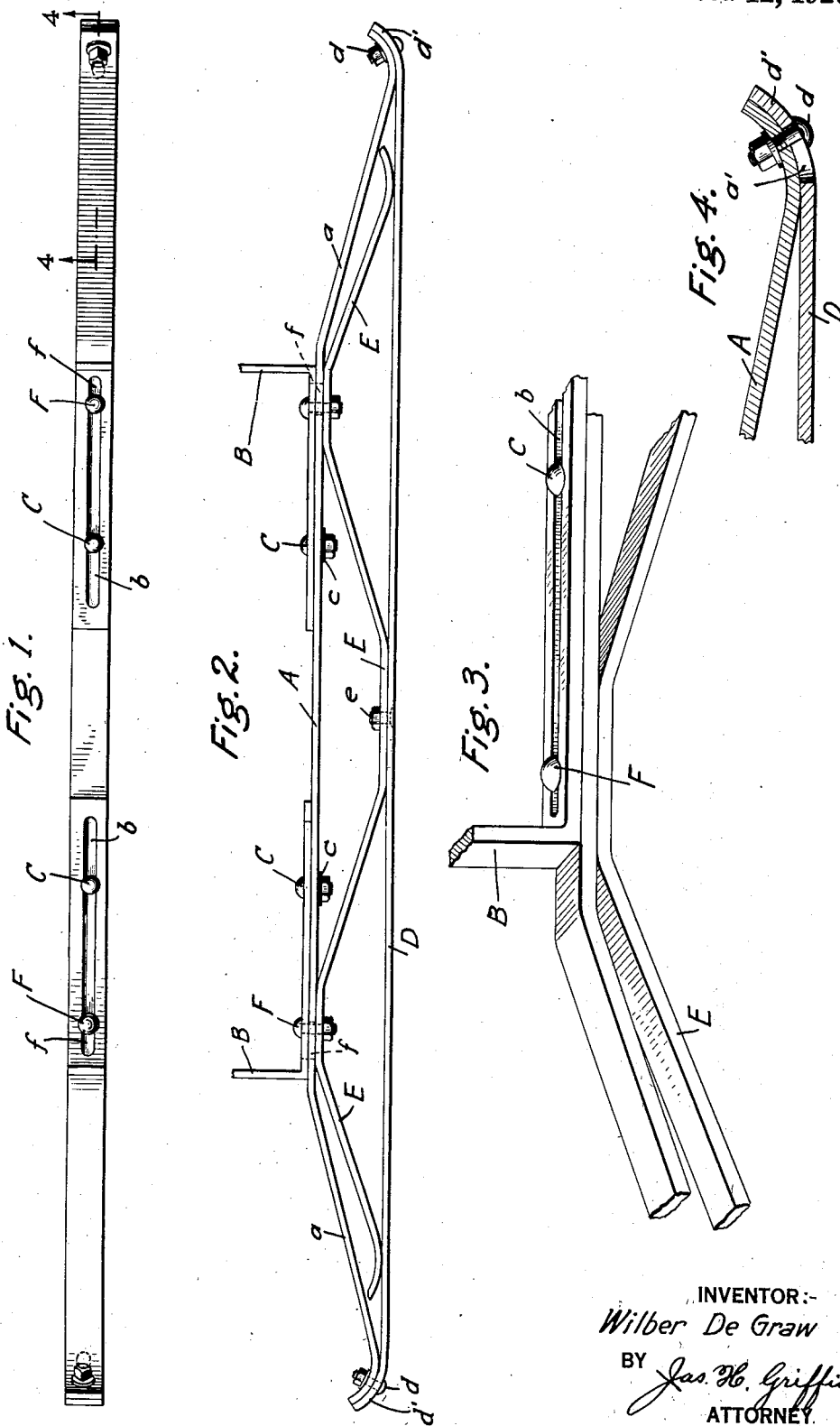

WILBER DE GRAW, OF WOODCLIFF, NEW JERSEY, ASSIGNOR TO ABRAM C. DE GRAW, OF NEW YORK, N. Y.

AUTOMOBILE-BUMPER.

1,355,592.  Specification of Letters Patent.  Patented Oct. 12, 1920.

Application filed June 6, 1919. Serial No. 302,199.

*To all whom it may concern:*

Be it known that I, WILBER DE GRAW, a citizen of the United States, residing in Woodcliff, county of Hudson, and State of New Jersey, have invented a certain new and useful Automobile-Bumper, of which the following is a specification.

This invention is an automobile bumper of the character adapted to be mounted at the front of an automobile to take up the impact of collisions, due, more particularly, to the sudden stopping of a preceding car at a crossing, or the backing up of a car ahead, although, manifestly, it will serve as a guard to the lamps, as well as the other forward portions of the car under all conditions.

Automobile bumpers of the general character described have long been employed, but, their structures almost invariably embody helical or coiled springs which render their construction more or less complicated and unsightly. Moreover, when helical springs are employed, the constructions in which they are incorporated are such that it is practically impossible to preclude rattling for any protracted period as the joints work loose and more or less lost motion results.

With the foregoing considerations in mind, the object of the present invention is to provide a bumper of great simplicity, yet attractive in appearance, which is, in effect, a combination of several leaf springs, associated in the form of a frame work so constituted and proportioned that impacts thereon will be transmitted through substantially all parts of the bumper and be so equalized and proportioned as to minimize the jar on the automobile with which the bumper is associated. The employment of helical springs with their well known tendency to localize shock are thus disposed of and a superior and more economical bumper produced.

Features of the invention other than those specified will be apparent from the hereinafter detailed description taken in conjunction with the accompanying drawings.

In the accompanying drawings I have illustrated one practical embodiment of the invention, but the construction therein shown is to be understood as illustrative only, and not as defining the limits of the invention.

Figure 1 is a rear elevation of a bumper embodying the present invention;

Fig. 2 is a plan view thereof;

Fig. 3 is a fragmental perspective of a portion of the device; and

Fig. 4 is a section on the line 4—4 of Fig. 1.

Referring to the drawings A designates a supporting member in the form of an elongated metallic plate, the intermediate portion of which is preferably straight, but having its opposite end portions $a$ bent into forwardly diverging directions, as shown best in Fig. 2. The intermediate portion of the supporting member has secured thereto a pair of brackets B adapted to be rigidly secured to the chassis of the car, and these brackets are slotted at $b$ to allow of their lateral adjustment to compensate for chassis frames of varying widths. Bolts C pass through the slot $b$ and through the supporting member A, and associated with these bolts are washers or nut locks $c$ by virtue of which the parts are rigidly secured together and precluded from jarring loose.

Extending across the front of the device is a bumper plate D which is secured at its opposite ends to the extremities of the supporting member A by means of bolts $d$, and in order that these parts may more readily coöperate, the extremities of both of said members are curved on an arc of a circle, as shown at $d'$. Moreover, to allow of resilient coöperation between said members, the bolts $d$ pass through slots $a'$ in the plate D with a result that if the bumper plate D receives an impact sufficient to flex the diverging portion $a$ of the supporting member, the slots $a'$ will allow of such flexing without placing undue strain on the bumper plate D, thereby rendering the bumper extremely sensitive in this respect. In order to support the bumper plate D against shock received intermediate its ends, there is interposed between the plates A and D a plate E which is secured at its center to the medial point of the plate D by a bolt $e$, and at the medial points between its center and its free ends to the plate A by bolts F. The bolt $e$ serves to rigidly lock the parts together, but the bolts F pass through slots $f$ which allow of flexing of the respective halves of the plate E, which halves serve, in effect, as a pair of leaf springs. It will, of course, be understood that the bolts F are not tightened up to such degree as to preclude their sliding in the slots $f$ as this is desirable to allow of the proper flexing of the plates and to further allow of their return to normal positions after the plate D has been subjected to an impact. The opposite ends of the plate E are unattached, but press against the bumper plate D as shown in Fig. 2.

The whole structure, except perhaps the brackets B, is formed of resilient or spring material, and may be said to embody the coöperation of a plurality of leaf springs. For example, those portions of the supporting member A which extend laterally of the brackets B are in the true form of leaf springs, the respective halves of the plate E are leaf springs, and the plate D may be said to be a strap leaf spring or its respective halves consist, in effect, each of a leaf spring which is secured at its end by one of the bolts $d$. The whole device is thus springy or resilient and each and every part thereof possesses that yielding quality required to take up shocks or impacts. After an impact or shock is received at almost any portion of the bumper it will, manifestly, be distributed throughout substantially the entire structure, and thereby minimized through the cushioning action of the coöperating spring elements thereof.

By providing the slotted connections between the parts, the dampening of the resilient action of said parts is obviated, and they are not precluded from resilient coöperation as would be the case if rigid connections were employed between each of the spring-like elements.

The structure as a whole is extremely simple, is economical in manufacture and esthetic in appearance. It is durable in use, and its parts are so associated that there is no tendency for them to work loose with respect to one another, and result in lost motion which would cause rattling. Moreover, the device is highly efficient, and, in practice, it is found to properly cushion and dissipate the jars or impacts to which it would normally be subjected, without imposing a strain on any particular portion of the structure as such strain is automatically distributed throughout the entire device and thereby equalized and proportioned.

Having thus fully described my invention, what I claim as new and desire to secure by Letters Patent is:

1. An automobile bumper embodying a supporting plate adapted to be mounted on a vehicle the opposite lateral portions of which are bent forwardly in diverging relation to one another, a substantially straight bumper plate extending from end to end of the supporting plate and secured to said supporting plate at the opposite ends thereof, and an intermediate resilient plate interposed between the supporting plate and the bumper plate and alternately secured at spaced intervals to said two plates.

2. An automobile bumper embodying a resilient supporting plate adapted to be mounted on a vehicle the opposite lateral portions of which are bent forwardly in diverging relation to one another, a substantially straight bumper plate extending from end to end of the resilient supporting plate and secured to said supporting plate at the opposite ends thereof, and an intermediate resilient plate interposed between the resilient supporting plate and the resilient bumper plate and alternately secured at spaced intervals to said two plates, whereby the bumper is composed of resilient elements which collectively serve to distribute impacts or shocks throughout the entire structure for the purpose of proportioning and minimizing such shocks.

3. An automobile bumper embodying a supporting plate, means for mounting said supporting plate on a vehicle, a bumper plate secured at its opposite ends to the supporting plate and a resilient plate interposed between said plates for spacing them apart, said resilient plate being alternately secured at spaced intervals to the supporting and bumper plates.

4. An automobile bumper embodying a supporting plate, means for mounting said supporting plate on a vehicle, a bumper plate secured at its opposite ends to the supporting plate and a resilient plate interposed between said plates for spacing them apart, said resilient plate being alternately secured at spaced intervals to the suporting and bumper plates, and said resilient plate having slotted connections with the supporting plate to allow of the flexing of the resilient plate when the bumper plate is subjected to jars or impacts.

5. An automobile bumper embodying a supporting plate, and a bumper plate secured at its opposite ends to the opposite ends of the supporting plate, and leaf springs positioned intermediate said plates for resiliently spacing them apart intermediate their ends.

6. An automobile bumper embodying a supporting plate adapted to be mounted on a vehicle, a bumper plate secured at its opposite ends to the opposite ends of the supporting plate and leaf spring members rigidly secured to the bumper plate and yieldably secured to the supporting plate for spacing the bumper and supporting plates apart intermediate their ends.

7. An automobile bumper embodying a resilient supporting plate adapted to be mounted on a vehicle, a resilient bumper plate secured at its opposite ends to the opposite ends of the supporting plate and resilient leaf spring elements mounted on the bumper plate and having sliding connection with the supporting plate for spacing said plates apart intermediate their ends.

In testimony whereof, I sign my name to this specification.

WILBER DE GRAW.